Nov. 12, 1957

W. J. BLAZEK ET AL 2,812,621

APPARATUS FOR AUTOMATICALLY FORMING
AND FINISHING GROOVES IN WORKPIECES

Filed April 19, 1954

INVENTORS
William J. Blazek
Richard C. Evans
Rex C. Barkley
BY
W. O. Rambo
ATTORNEY

FIG. 4

INVENTORS
William J. Blazek
Richard C. Evans
Rex C. Barkley
BY
ATTORNEY

Nov. 12, 1957  W. J. BLAZEK ET AL  2,812,621
APPARATUS FOR AUTOMATICALLY FORMING
AND FINISHING GROOVES IN WORKPIECES
Filed April 19, 1954  11 Sheets-Sheet 5

INVENTORS
William J. Blazek
Richard C. Evans
Rex C. Barkley
BY
ATTORNEY

United States Patent Office 2,812,621
Patented Nov. 12, 1957

2,812,621

APPARATUS FOR AUTOMATICALLY FORMING AND FINISHING GROOVES IN WORKPIECES

William J. Blazek, New Lexington, Richard C. Evans, Lancaster, and Rex C. Barkley, New Lexington, Ohio, assignors to Lempco Products, Inc., Bedford, Ohio, a corporation of Ohio Application April 19, 1954, Serial No. 423,907

13 Claims. (Cl. 51—92)

This invention relates to grinding machines, and more particularly to grinding machines for producing flutes, grooves, teeth, gashes and like formations in metallic and other work bodies or pieces. Such machines find a field of usefulness in forming the teeth, for example, of rotary milling machine cutters, or in the reshaping or dressing of such cutters. Hitherto, such grinding machines as conventionally constructed have had the several operations involved in the grinding of rotary milling cutters, reaming tools and the like, largely manually controlled and executed. As a result, such prior machines, when considered in relation to the grinding machine forming the present invention, are characterized generally by a lower rate of finished work output in a given period of time and under equal conditions, higher operating costs, and finished work evidencing human errors and inconsistencies.

Broadly, therefore, it is the main object of the present invention to provide a power driven, completely automatic grinding machine for forming or dressing rotary milling cutters, or the like, in which the machine will perform consecutively the several operations of presenting a substantially cylindrical work body to the circumferential edge of a rotary motor-driven grinding wheel or disk, and suitably moving, and indexing the work body relative to the grinding wheel, moving the grinding wheel relative to the work body and automatically stopping the machine when work operations are completed, whereby to produce finished tooth-forming grooves in said body, thus eliminating human errors and inconsistencies in the finished work.

Another object is to provide a machine of this type wherein the same further includes a work-supporting and indexing arbor by which a work body may be mounted thereon for intermittent rotation about its longitudinal axis, whereby to form an appropriate number of relatively spaced tooth-forming grooves or gashes in the circumference of the work body in an automatic manner.

Another object is to provide a grinding machine for automatically performing the operations of gashing a work piece or body at spaced intervals around its periphery to form cutter teeth thereon, and wherein the machine includes a base on which is mounted a longitudinally movable work-supporting table and a rotary grinding wheel, the machine further including automatically controlled motor-driven means for imparting regulated reciprocatory travel to the table to cause a work body mounted thereon to be moved into and out of grooving engagement with the circumferential edge of the grinding wheel.

Another object of the invention is to provide an automatic grinding machine of the character set forth in which a reciprocatory table carries an indexing head on which is mounted an intermittently rotatable, normally locked, work-supporting spindle means, and wherein the release and rotation of said spindle means is controlled by an indexing plate or disk formed with a notched escapement-engaged peripheral edge, the plate or disk being replaceably mounted on the spindle means to adapt the machine to a change of work involving the formation of cutters having a varying number and spacing of teeth.

A further object is to provide in such a machine a rotary motor-driven grinding wheel which is supported on a base-mounted frame for vertical adjustment and in association with a reciprocatory work-supporting table, and wherein means are provided actuated by table movement and formed so that the wheel may be moved incrementally forwardly with the reciprocation of the associated work-carrying table, to cause the wheel to penetrate a work body automatically to required depths in the formation of teeth on the body.

Still a further object is to provide novel electrically actuated controls for such a grinding machine, by which the operations thereof are adapted to automatic regulation in its groove-grinding cycle, but accompanied with manual control in the placing of new work bodies on and the removal of completed work bodies from the machine.

For a further understanding of the invention, reference is to be had to the following description and to the accompanying drawings, wherein.

Figure 4:
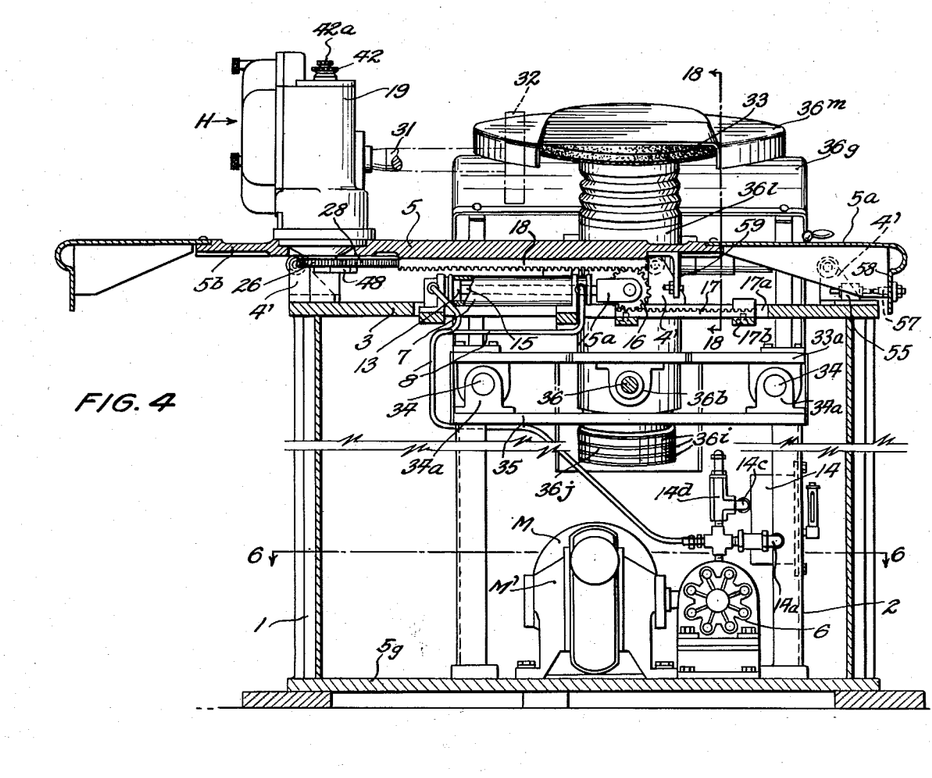
Fig. 4 is a vertical longitudinal sectional view taken through the machine on the line 4—4 of Fig. 1.
Figure 5:
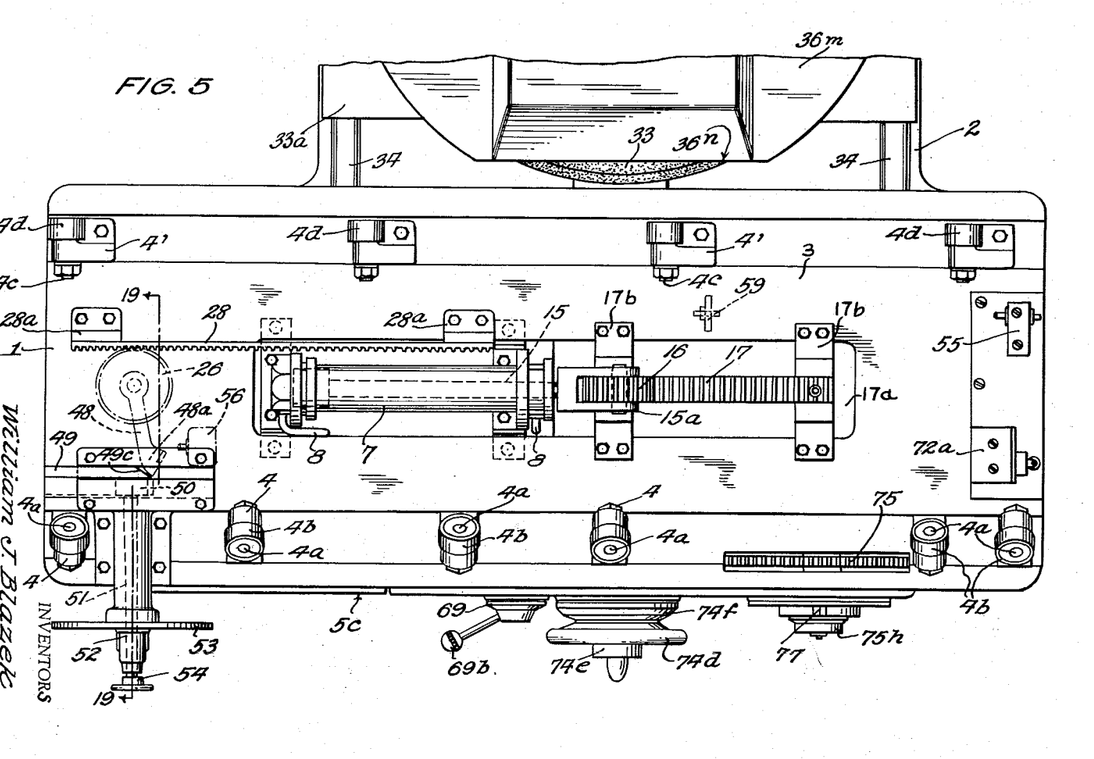
Fig. 5 is a top plan view of the base of the machine with the table removed to show more clearly certain mechanisms employed in the movable support of the table.
Figures 17, 18:
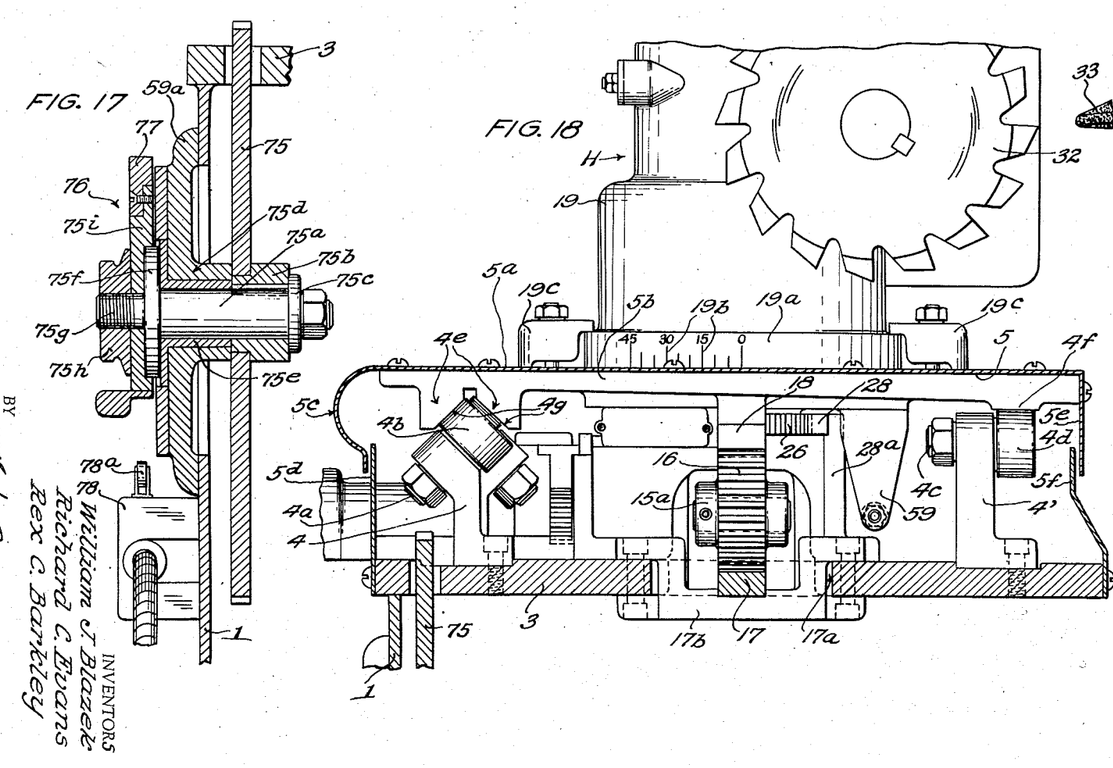
Fig. 17 is a similar view taken on the line 17—17 of Fig. 13.
Fig. 18 is a transverse vertical sectional view taken on the line 18—18 of Fig. 4.

In these drawings the numeral 1 designates the main, floor-mounted, generally rectangular, base of the machine which, in this instance, is formed rearwardly thereof with a grinding wheel-supporting frame 2, the latter being arranged axially thereof in a plane substantially perpendicular to that of the base 1. Formed with the upper part of the base 1 is a stationary horizontally disposed bed plate 3 on which, as shown in Figs. 4, 5 and 18, are mounted longitudinally and transversely spaced brackets 4 and 4'. The brackets 4, which are disposed on the bed plate 3 contiguous to the upper front edge of the machine, are each formed to include an upwardly disposed angular end to which is secured a perpendicularly extending stud 4a carrying an antifriction table-supporting and guiding roller 4b. In the specific machine illustrated, three of the six brackets 4 face so that the rollers 4b thereof are disposed outwardly toward the front of the machine while the remaining three face so that the rollers carried thereby are disposed inwardly of the machine, as shown in Fig. 5. The four brackets 4', which are disposed along the rear upper edge of the machine, carry studs 4c which are horizontally arranged for the support of vertically disposed rollers 4d.

Positioned on the rollers 4b and 4d are transversely spaced longitudinally extending gibs 4e and 4f of a longitudinally movable, horizontally positioned, work-carrying table or carriage 5. As shown in Fig. 18, the gibs 4e are formed to provide oppositely facing downwadly and outwardly inclined surfaces 4g which are disposed to engage the outer circumferential surfaces of the oppositely arranged and angularly disposed sets of rollers 4b. The rollers 4b and 4d serve jointly to support the table 5 for limited longitudinal movement on the part thereof in a horizontal plane. Additionally, the rollers 4b, because of their angularity and engagement with inclined gib surfaces 4g, serve to limit the table to longitudinal sliding movement and to preclude transverse movement thereof.

The table comprises, in the construction illustrated, a thin sheet top plate 5a to the under surface of which is fastened a metallic casting 5b with which the gibs 4e and 4g form integral parts. If desired, the forward longitudinal edge of the table plate 5a may be formed with a downwardly directed apron 5c, which is outwardly bowed in transverse cross section and has its lower edge portion arranged in registry with the complemental upper edge portion of a vertically and longitudinally extending, stationary facing strip 5d, the latter being carried by the upper front part of the bed plate 3 of the base 1. The rear of the table plate 5a, as shown in Fig. 18, has associated therewith a flat, vertically depending, apron 5e, the lower longitudinal edge of the latter being disposed in spaced overlapping registry with the upper edge of a relatively stationary face plate 5f carried by and arising from the bed plate 3 of the base 1.

Figure 6:
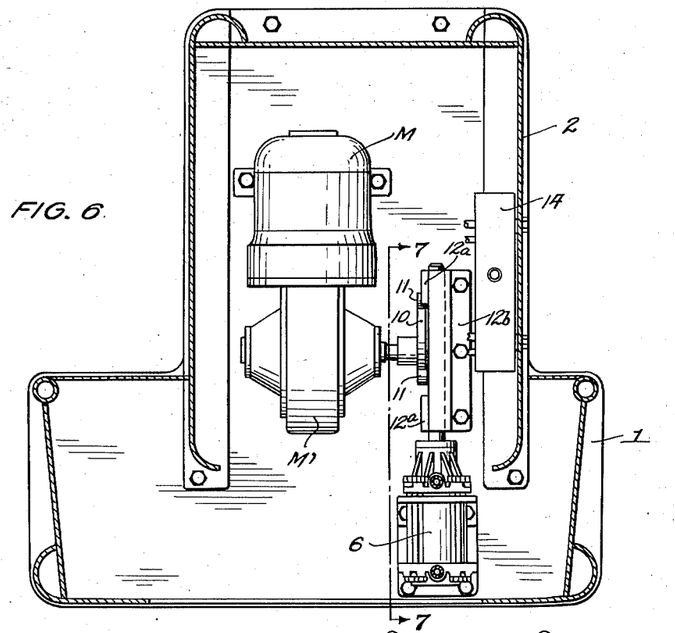
Fig. 6 is a horizontal sectional view taken on the line 6—6 of Fig. 4 and showing an electric motor-driven fluid-actuated means for producing table movement.
Figure 7:
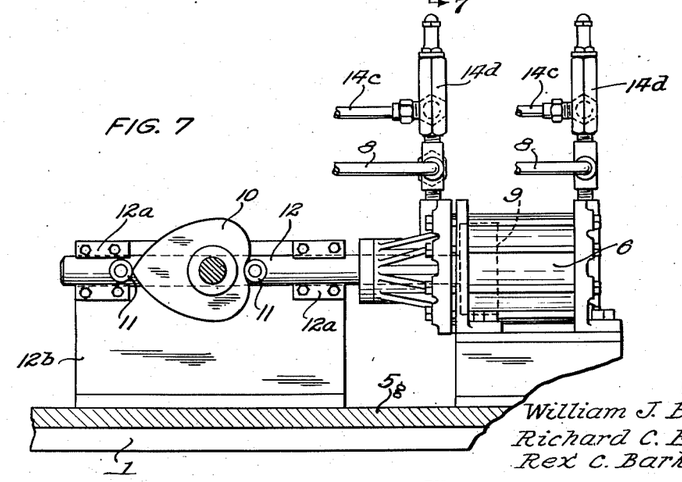
Fig. 7 is a detail sectional view taken on the line 7—7 of Fig. 6.

To impart controlled longitudinal sliding movement to the work-supporting table 5, we may employ, for example, a closed circuit hydraulic system which comprises a fluid-displacing or pressure-producing pump 6 mounted on the horizontal bottom plate 5g of the base 1, as shown in Figs. 4, 6 and 7. Stationarily positioned on the bed plate 3 of the base 1, and disposed longitudinally of and below the table 5, is a cylinder 7, which is connected by means of piping, shown at 8, to the opposite ends of a piston chamber formed longitudinally in the main cylinder of the pump 6. Arranged for reciprocation in the pump cylinder is a piston 9 (Fig. 7).

To reciprocate the pump piston the latter carries a rod 12 which extends exteriorly of the pump cylinder at one end of the latter and has fastened thereto spaced rollers 11. Arranged for rotation between these rollers and in constant peripheral contact therewith is, in the construction illustrated, a heart-shaped cam 10. To rotate the cam 10 use is made in this instance of an electric motor M which drives a conventional gear-type, speed-reducing mechanism M', the driven shaft of the latter carrying the cam 10. Preferably, the piston rod 12 because of its length is mounted in guides 12a formed in connection with a stationary bracket 12b arising from the bottom wall 5g of the base 1.

It will be seen that as the pump piston 9 is reciprocated in its cylinder by the motor-driven cam 10 and rollers 11, corresponding movement is imparted to a piston 13 slidably arranged in the cylinder 7, since the piping 8 provides a closed fluid-transmitting and returning circuit between the cylinders 6 and 7. If desired, there may be used in connection with this closed fluid circuit a tank 14 for the storage of oil or other fluid, whereby to keep the circuit operatively filled at all times with the fluid and to replace fluid which may escape accidentally from the circuit through packing gland or joint seepage.

Figures 23, 24, 25:
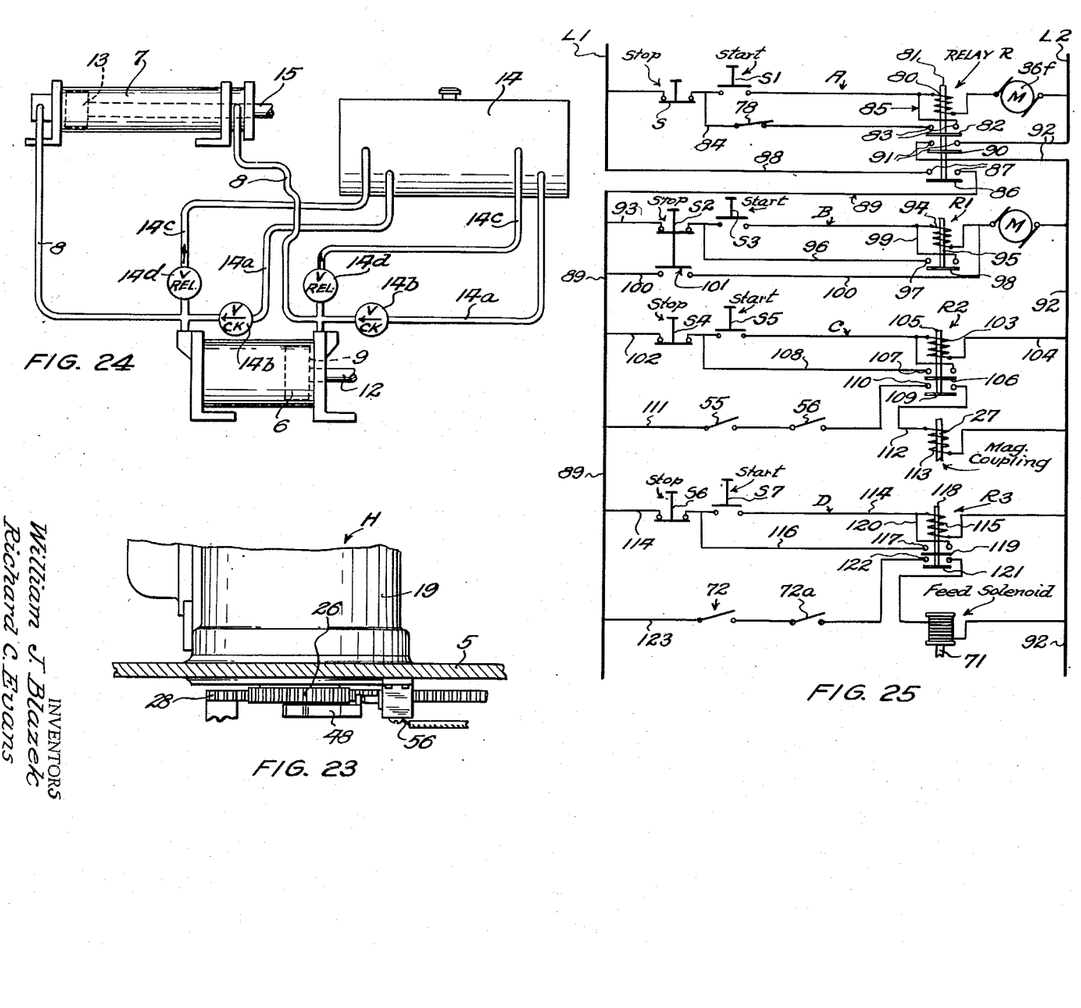
Fig. 23 is a detail vertical sectional view taken on the line 23—23 of Fig. 22.
Fig. 24 is a diagrammatic view of a hydraulic circuit employed in the machine.
Fig. 25 is a similar view of the electric circuits used in connection with the various controls employed in obtaining the automatic operation of the machine.

To this end, the receiver 14 carries a pair of pipes 14a which lead to the opposite ends of the cylinder 6, as shown in Fig. 24, each of the pipes 14a having arranged therein a check valve 14b. Also, a second pair of pipes 14c extends between the receiver 14 and the opposite ends of the cylinder 6. Pressure relief valves 14d are provided in the pipes 14c and operate automatically to by-pass fluid to the receiver upon the presence of predetermined over-loading pressures within the fluid circuit, as will be readily understood.

The piston 13 of the table-actuating cylinder 7 is provided with an exteriorly projecting rod 15 and journaled for rotation on the yoke-shaped outer end 15a of the rod is a gear 16. The teeth of the latter mesh with the teeth of gear racks 17 and 18. In this instance the shorter lower rack 17 is positioned stationarily in a slot 17a formed in the bed plate 3 and is supported by cross brackets 17b carried by said bed plate, while the longer upper rack bar 18 is mounted on the underside of the table 5 in depending relation therewith. It will be noted that as the gear 16 moves along the gear rack 17 through the operation of the piston 13 in the cylinder 7, the rotation of the rack-confined gear 16 will cause the table 5 also to move longitudinally of the rack 17. This motion is such as to cause the table 5 to move through the length of rack 17 with each stroke of the piston 13 in either direction, and the table 5 will travel approximately twice as far as the length of stroke of the piston 15. By the use of switch controls, hereinafter described, which govern the operation of the operating circuit for the pump motor M, the table 5 is adapted to be automatically reciprocated in a controlled manner to present work pieces mounted thereon to the action of a grinding wheel.

Figure 8:
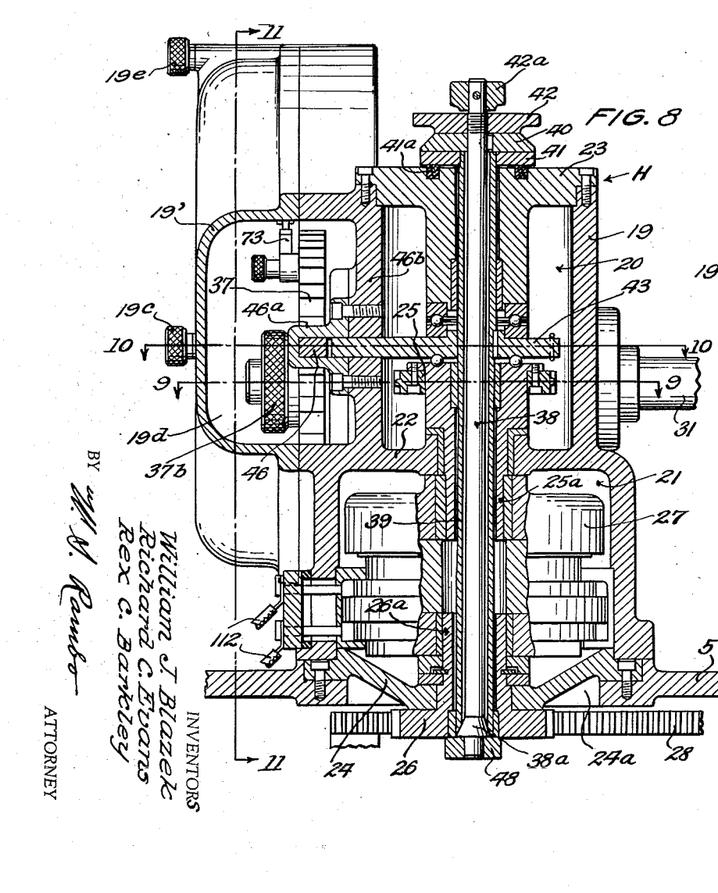
Fig. 8 is a vertical longitudinal sectional view taken through the indexing head of the machine.

Mounted on and adjacent to one end of the table 5 is a work-carrying and indexing head H. The latter includes a housing 19 formed to embody internally disposed upper and lower chambers 20 and 21, respectively, which are separated by a web 22 arranged within said housing substantially midway of its height. Additionally, the housing includes upper and lower end walls 23 and 24, respectively, the lower wall being positioned in an opening 24a formed in the table 5, as shown in Fig. 8. The walls 22 and 24 are formed axially thereof with vertically aligned openings which constitute bearings for the rotatable reception of the extended tubular hubs 25a and 26a, respectively, of gears 25 and 26. Uniting these gears is a magnetic or other equivalent automatically controllable clutch means 27 by which controlled motion, obtained through the longitudinal travel of the table 5, may be transferred from the lower gear 26 to the upper gear 25 at appropriate periods in the operation of the machine, as will appear hereinafter.

Figures 19, 20, 21, 22:
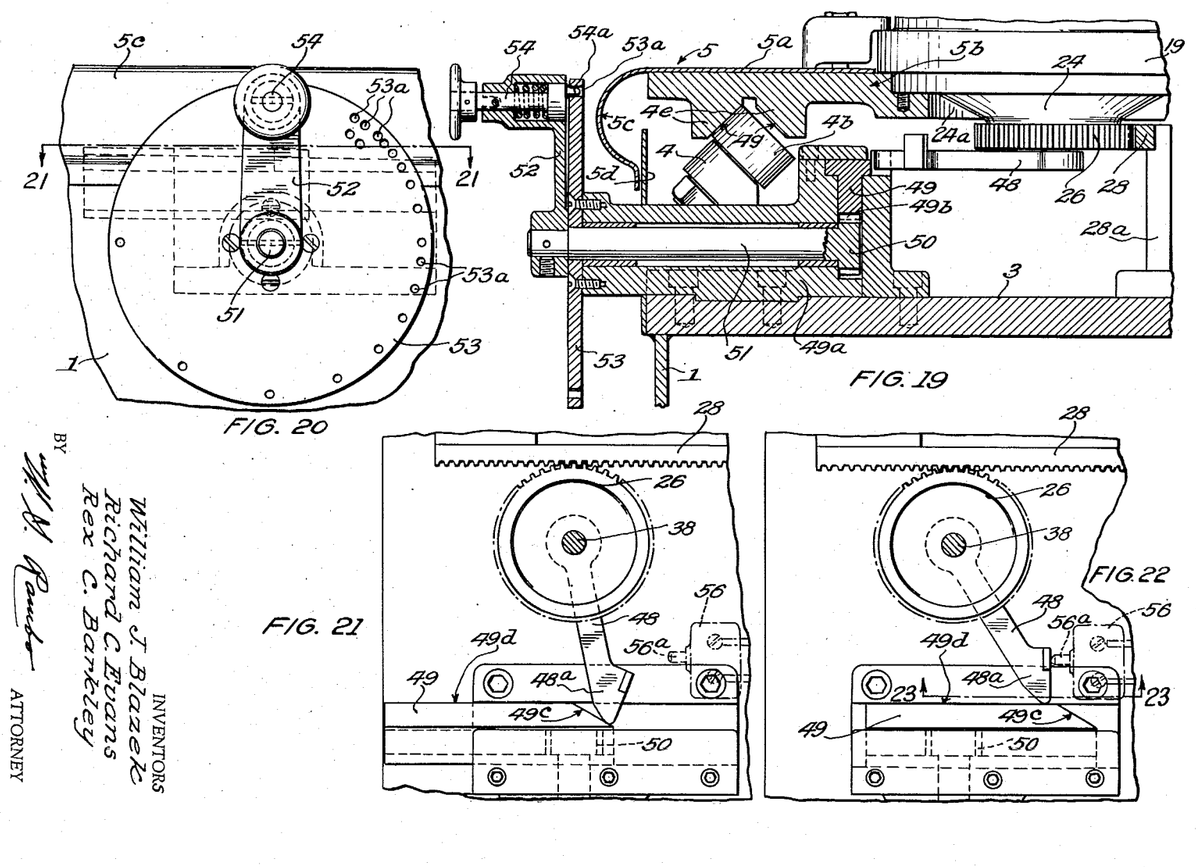
Fig. 19 is a similar view taken on the line 19—19 of Fig. 5.
Fig. 20 is a front elevational view of the index selector dial.
Fig. 21 is a detail horizontal sectional view taken on the line 21—21 of Fig. 20 showing the index selector control mechanism in an electric control circuit-opening position.
Fig. 22 is a similar view showing the mechanism of Fig. 21 in a circuit-closing position.

The lower gear 26 meshes with a gear rack 28, shown best in Figs. 5 and 19. This rack is stationary on the bed plate 3 and is carried by supporting brackets 28a arranged on said bed plate. It will be apparent, therefore, that as the table 5 moves longitudinally of the base 1, the gear 26 will be caused to rotate by the intermeshing of the teeth thereof with those of the rack 28. The hubs 25a and 26a of said gears are joined with opposite members of the magnetic clutch 27, or its equivalent, in a manner providing for rotation in unison on the part of the gears 25 and 26 when the clutch is energized, or the opposed members thereof coupled to provide for power transmission therethrough.

Figure 2:
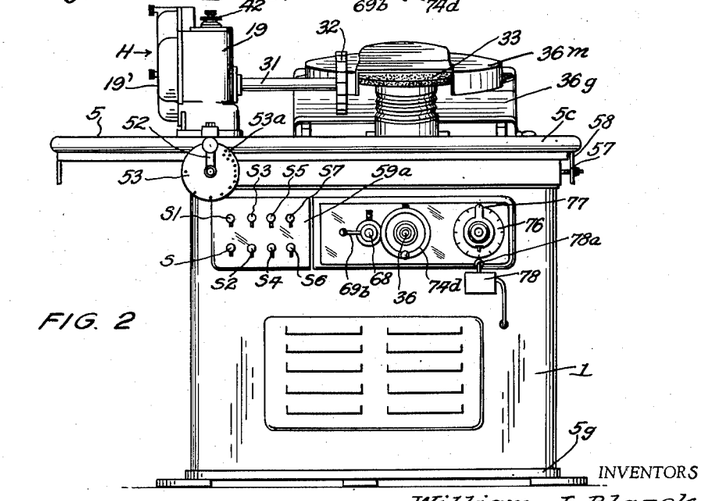
Fig. 2 is a front elevational view thereof.
Figure 9:
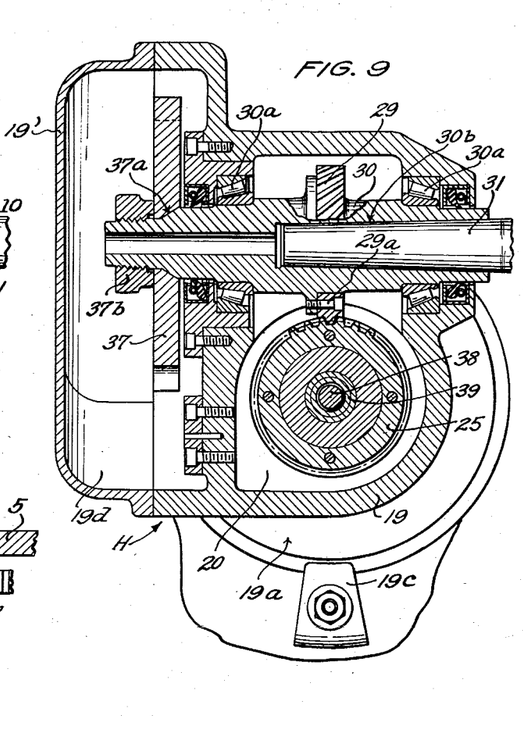
Fig. 9 is a horizontal sectional view taken on the line 9—9 of Fig. 8.

Preferably, and as here shown, the horizontally disposed gear 25 is formed with helical teeth, the latter meshing with similarly formed teeth of a vertically arranged gear 29. The latter gear is fastened, as at 29a, to an arbor-receiving spindle 30 which is supported in antifriction bearings 30a mounted in relatively aligned order in the housing 19 of the indexing head as shown in Fig. 9. The spindle 30 is formed with a longitudinally extending socket 30b in which is received and held for rotation one end of a removable work-carrying arbor 31. The latter, as shown in Fig. 2, extends longitudinally of the table 5 and at its outer end is adapted to removably receive for rotation in unison therewith a work body 32. This body may be, for example, a cutter blank from which a milling cutter is made, or it might be a finished cutter which has been in use and requires redressing or recutting. The fact that the table 5 travels longitudinally a certain predetermined distance necessitates that the arbor 31 shall be of a length adapted to carry the work body 32 up to and past the circumferential edge of a grinding wheel 33, carried by the base frame 2, in order to complete a given cut or gash across the wheel-engaged face of the work and to maintain the indexing head spaced at all times from the grinding wheel.

Figure 3:
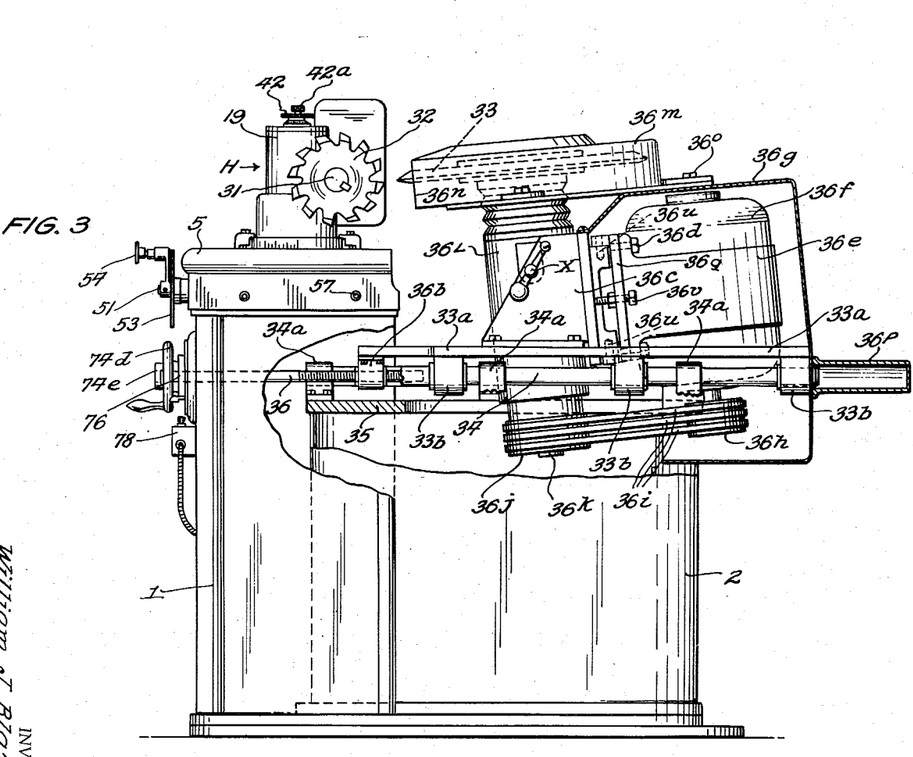
Fig. 3 is an end elevational view of the machine, parts being broken away to show internal construction.

By referring to Fig. 3 it will be noted that the grinding wheel assembly comprises, in the specific machine illustrated, a carrier plate 33a. From the underface of this plate spaced bearing brackets 33b rigidly depend. Openings formed in these brackets receive a plurality of spaced, stationary and parallel guide rods 34, the latter, in turn, being supported by brackets 34a arising in a stationary manner from the horizontally disposed top member 35 of the base frame 2. The grinding wheel 33, which is carried by the plate 33a, may be moved toward and away from the plane of longitudinal movement of the work body 32 by the adjustments afforded by automatic means and manually through the use and operation of a feed screw 36. This screw is suitably journaled for rotation in bearings carried by the base 1 and the threaded shank of the screw is received in one or more internally threaded bracket members 36b carried by and depending rigidly from the carrier plate 33a, as shown in Fig. 3.

Figure 1:
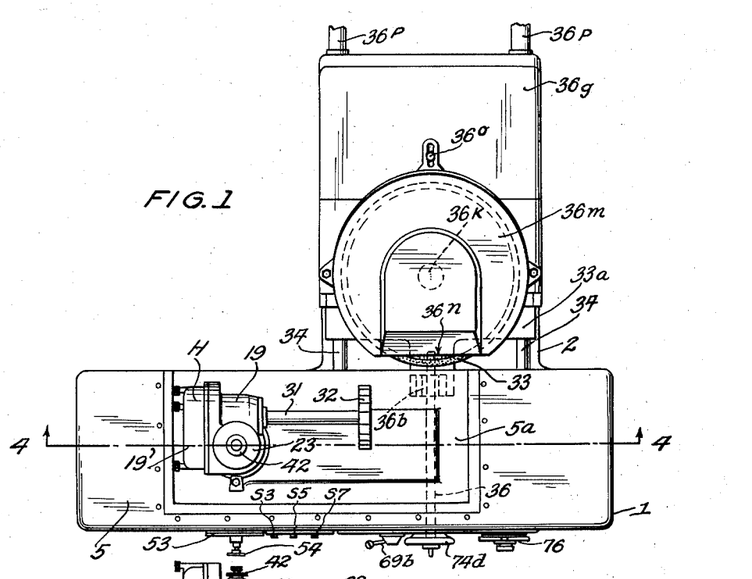
Fig. 1 is a top plan view of the improved automatic grinding machine of the present invention.

The plate 33a of the grinding head carries an upright rigid bracket 36c to which is fastened as at 36d a saddle member 36e. This member is employed to support a grinding wheel-driving electric motor 36f, which may be disposed within a protective boxing shown at 36g. The depending armature shaft of this motor is equipped with a belt wheel 36h around which pass a plurality of endless drive belts 36i. The belts also pass around, in the machine illustrated, a complemental belt wheel 36j which is fixed to the lower end of a drive shaft 36k. On the upper end of this shaft, the grinding wheel 33 is removably mounted for rotation in unison with the shaft and under power derived from the motor 36f. The bracket 36c adjustably carries a bearing sleeve 36L in which the grinding wheel shaft 36k is rotatably mounted. The shaft 36k is adjustable in the sleeve 36L by means of a raising and lowering mechanism controlled by an operating crank X to vertically adjust the plane of operation of the grinding wheel 33. The motor 36f is mounted on a subbracket 36q which is pivoted to the bracket 36a, or at 36u, to take up slack in the drive belts 36i. The pivotal adjustment of the motor is held by locking screws 36v carried by the subbracket 36q and engaging the bracket 36c. A circular protecting housing 36m may be positioned around the grinding wheel, the housing at the front thereof being provided with a linearly extending portion 36n beyond which the grinding edge of the wheel 33 projects, as shown in Figs. 1 and 3, for engagement with a work body. The housing 36m may be adjusted on the top of the boxing 36g by the slot and nut construction shown at 36o to control the spacing of the linear edge 36n with respect to the edge of the grinding wheel. Thimbles 36p may be carried by the rear of the boxing for receiving and protecting the rear ends of the rods 34.

Figures 10, 11, 12:
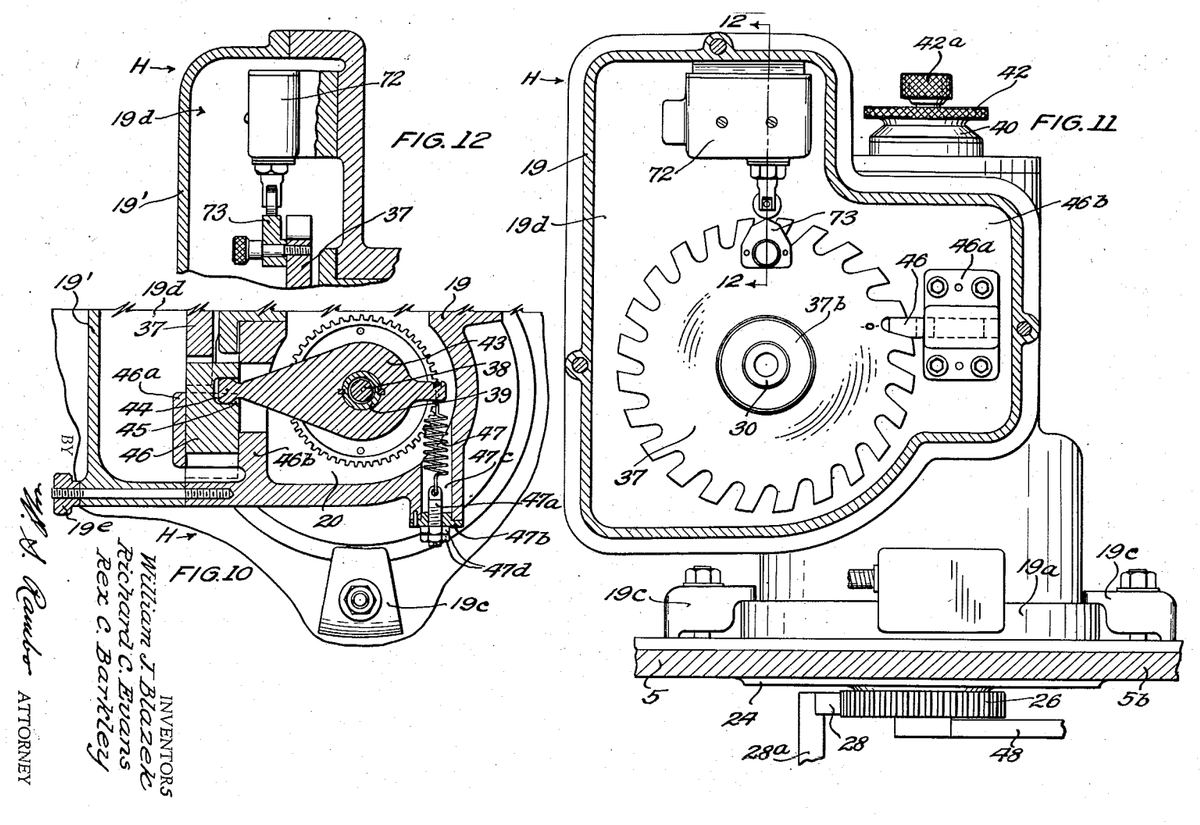
Fig. 10 is a similar view taken on the line 10—10 of Fig. 8.
Fig. 11 is a vertical transverse sectional view taken on the line 11—11 of Fig. 8.
Fig. 12 is a detail sectional view taken on the line 12—12 of Fig. 11.

In order to effect regulated step by step indexing rotation of a work body 32 positioned on and about the longitudinal axis of the arbor 31 between states of longitudinal movement of the work body in unison with the table 5, whereby to present automatically different portions of the circumference of the work body to the grinding action of the wheel 33 in producing grooves, flutes, channels or gashes in said body, or in the redressing or refinishing of teeth in finished bodies, use is made of an interchangeable indexing plate or disk 37, see Figs. 8, 9 and 11. The latter is here shown as being removably or replaceably mounted on the inner end of the spindle 30, that is, the end opposite to that from which an arbor 31 projects. In this instance, the inner end of the spindle 30 is formed with a tapered seat 37a for the reception of a tapered opening formed in the hub region of a disk 37. Beyond the seat 37a, as shown in Fig. 9, the inner end of the spindle is threaded for the reception of a clamping nut 37b by which an indexing plate or disk is securely held in its operative position on the inner end of the associated spindle.

The plates or disks 37 are supplied with the machine in sets, wherein each plate or disk has a different number of teeth on its circumferential edge. As shown in Fig. 11, however, the plate or disk 37, therein selected for illustration, is formed with twenty-four indexing teeth, grooves or notches and the work body or cutter 32, as shown in Fig. 3, is formed to include twelve teeth, grooves or notches. Therefore, the indexing disk 37 is required to move a distance of two teeth or notches for each tooth or notch of the work body or cutter. Since the machine in use is supplied with a number of the index plates or disks, it is only necessary to mount on the inner end of the spindle a disk or plate 37 having the required number of teeth in order to control the number of teeth or notches which the machine will cut, grind or gash in a given work body or cutter.

Referring more particularly to Figs. 8 and 9 of the drawings, a rod 38 is shown as extending vertically and axially through the housing of the indexing head H and the hubs of the gears 25 and 26. Frictionally joined with and surrounding the rod 38 is a virtually coextensive sleeve 39. The lower end of the rod, in this instance, is formed with a conical enlargement 38a on which is seated the tapered, open lower end of the sleeve 39. At its upper end the sleeve 39 is provided with a slidably keyed bearing disk 40 which engages with the flat upper surface of a bottom bearing disk 41, the latter being fixedly mounted on the upper end of the sleeve 39 immediately below and in contact with the keyed disk 40. The lower surface of the disk 41 engages with a felt seal 41a which occupies an annular groove formed in the upper end wall 23 of the housing 19. The upper end portion of the rod 38 is externally threaded for the reception of the internally threaded axial part of a clamping disk shown at 42. The latter, when tightened, presses on the flat upper surface of the disk 40, maintaining thereby a frictional motion-transferring contact between the disks 40, 41 and 42 so that rotational movement imparted to the rod 38 will be transferred to the sleeve 39. The extreme upper end of the rod 38 is, as shown in Fig. 8, equipped with a fixed knob 42a by which the rod may be manually rotated when desired. By means of this construction the rod can be turned and adjusted axially with respect to the sleeve 39 to thereby adjust the angularity of the head H with respect to the axis of the table and adapt the machine to various types of work and work-supporting arbors.

Keyed to the sleeve 39 at a position thereon above the gear 25 is a lever arm 43, as shown in Figs. 8 and 10. The arm thus turns with the sleeve 39 and in so doing the outer headed end 44 of the arm, which is situated in a pocket 45 formed in a slidable escapement bar 46, imparts longitudinal sliding movement to said bar. The latter is supported by a guide bracket 46a fastened to a vertical wall 46b of the housing 19, and, as shown in Fig. 11 the outer end of the bar 46 is adapted to be positioned in any one of the notches formed between the teeth of the disk 37. When so positioned the bar 46 serves to hold the disk 37 and its associated work-carrying spindle 30 against rotation during the active grinding stage of machine operation which occurs when the grinding wheel 33 is in contact with a work body or cutter 32.

To assure positive relative engagement between the escapement bar 46, the lever arm 43 and the indexing disk 37, the lever arm at the end thereof opposite to that seated in the pocket 45 has secured thereto one end of a coil spring 47. The opposite end of this spring is fastened to an eye formed in the inner end of an adjustable screw 47a which is mounted in a cap 47b closing a passage 47c formed in the casing 19. Clamping and locking nuts 47d are carried by the outer end of the screw 47a in engagement with the cap 47b.

Secured to the lower end of the rod 38 at a position below the gear 26 is the hub of a cam lever 48 (see Figs. 19, 21 and 22), the lever having its outer end formed with a shoe 48a arranged for coaction with a slide member 49. This member is supported for longitudinal sliding movement in stationary brackets 49a positioned on the bed plate 3. The lower edge portion of the member 49 is formed with rack teeth 49b which mesh with those of a gear 50, the latter being mounted on the inner end of a shaft 51 journaled for rotation in bearings formed in the bracket 49a. The outer end of the shaft 51 is connected with the hub of a crank handle 52 which is movable over the outer face of a stationary position-determining disk 53 fixed on the bracket 49a supporting the shaft 51.

In this instance the disk 53 is formed around the periphery thereof with a plurality of unevenly spaced openings 53a which open to the outer face of the disk. The handle 52 is provided at its outer end with a hollow boss in which is slidably positioned a spring-pressed locking plunger 54, the inner end of the latter being formed with a pin 54a adapted to be positioned selectively in the circularly arranged openings 53a. Turning the handle 52, when the pin 54a is withdrawn from an opening 53, causes the bar member 49 and its beveled end 49c to be positioned in desired relation to the shoe of the cam lever 48.

Consideration of this structure will disclose that when the table 5 is moved to the left, as the machine is viewed in Figs. 4, 5 and 21, the shoe 48a of the lever arm 48 will strike the beveled end of the adjustable slide member 49, causing said arm to engage at its outer end the linear surface 49d of the slide member. The movement thus imparted to the cam lever or arm 48 will cause turning movement on the part of the rod 38 of the indexing head. Such turning movement of the rod 38 is imparted to the sleeve 39 through the frictional disks 40 and 41. The resulting partial turning movement of the sleeve 39 causes the lever 43 carried thereby to slide the escapement dog or bar 46 sufficiently to withdraw its outer end from holding engagement with the teeth of the indexing disk 37, thereby freeing the same for limited rotation so that the work piece 32 on the outer end of the arbor 31 will be turned sufficiently to present the required area thereof to the action of the grinding wheel when the table advances to the right on its next stroke, and at which time the bar 46 will be restored to its locking position in relation to the indexing dial 37.

As previously stated, the magnetic clutch or coupling 27 is arranged within the chamber 21 of the housing 19 and surrounds the extended tubular hubs of the gears 25 and 26. This clutch or coupling is preferably electrically controlled in a manner conveniently effected by coordinating the same with the movement of the table 5. To this end, the bed plate 3 has positioned thereon, adjacent to the right end thereof, as the mechanism is viewed in Figs. 4 and 5, a double-plunger push rod switch 55. Also, mounted on the underside of the table 5, at a position adjacent the cam lever 48 (Fig. 22), is an associated micro-switch 56 shown in Fig. 5. When the table 5 approaches the end of its movement toward the left side of the machine, the switch 56 is engaged and actuated by the cam lever 48 through contact of the shoe 48a of the lever with the beveled end 49c of the manually adjustable slide 49. This, in conjunction with the previous closing of the switch 55, will close a control circuit, hereinafter more fully defined, containing the switches 55 and 56, so that the coupling or clutch 27 will be energized to unite the gears 25 and 26 for joint rotation. Such rotation is produced by the motion of the table 5 in its response to the fluid-displacing motor-driven means and through engagement of the gear 26 of the movable table with the stationary base-mounted rack 28. The rotation of the gear 25 is imparted to the gear 29 and thence to the work-carrying arbor 31 when the magnetic clutch is energized and the escapement released.

The position of the slide member 49, which is adapted to be manually preset by the operation of the index selector dial assembly 53 of Figs. 19 and 20, governs the length of time the clutch or coupling 27 is energized in transmitting the motion of the gear 26 to the gear 25, whereby to vary the indexing angle of the intermittently roated spindle in providing for a different number of teeth on workpieces of corresponding proportions, and the formation of varying types of teeth, ribs or gashes in workpieces of different sizes and forms. When the table has reached the end of its motion to the left, as viewed in Fig. 4, the switch 53, which is mounted on the right side or end of the bed plate 3, is engaged by an adjustable stop 57 carried by the depending skirt 58 formed on the right side or end of the table 5, thereby opening the control circuit for the magnetic clutch 27 and interrupting the drive to the work-carrying arbor.

Upon such travel of the table to the left, as shown in Figs. 5 and 22, the lever arm 48 will traverse the beveled end 49c of the slide member 49, moving its shoe 49a into contact with the plunger of the switch 56. This results in mechanically rotating the rod 38 connected with the lower end of the rod 38 and, through the sleeve 39 and lever 43 the escapement bar 46 is moved to its inactive or withdrawn position in which it releases the indexing disk 37 for indexing rotation. During subsequent travel of the table to the right and with the work-carrying arbor 31 held against rotation, the work body 32 is brought into grinding contact with the wheel 33. As the motion of the table to the right is continued, the work body moves past the grinding wheel and as its motion reaches its end the bracket arm 59, shown in Fig. 4, will engage an operating plunger of the switch 55, thus closing the circuit in which the switch 56 is located for the next indexing cycle.

From the description so far given, it will be seen that as the table 5 moves back and forth in its longitudinal travel on the base 1, the indexing mechanism will effect a step-by-step rotation of the work, but holding the work from rotating while it is being acted upon by the grinding wheel. The rotation or indexing of the work takes place when the work is clear of the grinding edge of the wheel 33 and upon the end of travel of the table to the left, as just described. Normally, at the start of a given grinding operation and before any work is performed, the table is jogged into a position to place the work body 32, when held on the outer end of the arbor 31, in front of the grinding wheel, and thus to "dress" the work in the machine. This jogging action is accomplished by actuating a manually operated stop switch associated with the table movement control circuit of the machine, as later defined, to bring the table to the position indicated. The grinding wheel, through manual operation of the screw control 36, is then brought into touching or "sparking" contact with the work body to assure proper setting thereof. The automatic controls governing table movement can now be set in operation by closing the starter button switch on the front control panel 59a disposed on the front wall of the base.

Figure 14:
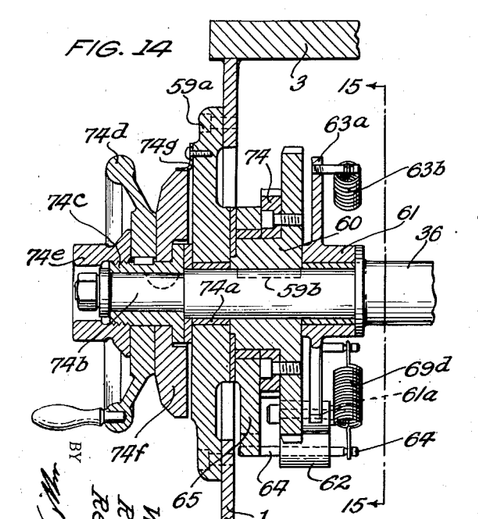
Fig. 14 is a vertical sectional view taken on the line 14—14 of Fig. 13.
Figure 15:
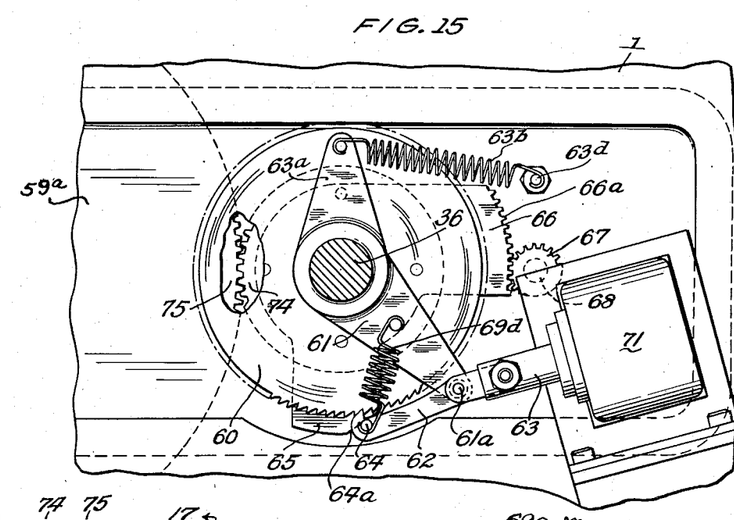
Fig. 15 is a vertical sectional view taken on the line 15—15 of Fig. 14 looking toward the rear of the control panel.
Figure 16:
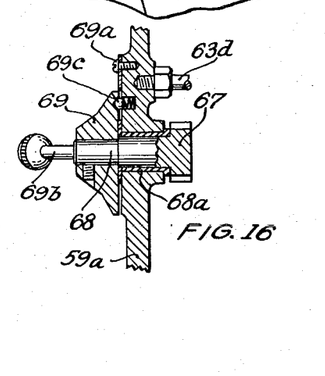
Fig. 16 is a vertical sectional view taken on the line 16—16 of Fig. 13.

The hand wheel operated screw 36 has keyed thereto, as shown at 59b in Fig. 14, a combined gear and ratchet wheel 60. Pivoted on the shaft 36 adjacent to the wheel 60 is a bell crank lever 61, the latter having one of its arms pivotally joined at 61a to a latch arm 62 and to the outer end of an armature 63 of a solenoid 71, while the other arm 63a of the lever 61 is connected with the free end of a coil spring 63b, the opposite end of this spring being fastened to a stud 63d projecting stationarily from the back of the panel 59a. Fixed on the outer end of the arm 62 is a transverse pin 64, which, as shown in Figs. 14 and 15, has its inner end engaged with an inclined surface 64a provided on one leg of a cam 65 which is mounted on the circular hub of the wheel 60 for turning movement thereabout. The cam is formed with a second leg 66 having segmental gear teeth 66a on its outer edge. These teeth mesh with those of a gear 67, the latter being formed on one end of a short shaft 68 which is journaled in a bearing 68a formed in the panel 59a. Fixed on the outer end of the shaft 68, in front of the panel 59a, is a dial 69 having a graduated peripheral edge which is movable relative to a stationary pointer 69a mounted on the panel 59a, the dial 69 being provided, in this instance, with an outwardly and angularly extending manipulatory crank rod 69b. The back face of the dial is formed with a plurality of spaced depressions for the reception of a spring pressed, position-maintaining ball element 69c. A coil spring 69d unites the arms 61 and 62 and serves to hold positively the outer end of the arm 62 in contact with the edge of the cam 65.

It will be seen that when the cam 65 is rotated by the turning of the dial 69 so that the inclined surface 64a thereof is moved toward the left, as the structure is viewed in Fig. 15, the arm 62 will be caused to move the ratchet wheel 60, through the engagement of the pin 64 with cam surface 64a, a greater distance with a fixed stroke length of the armature 63 than when the inclined surface 64a is rotated to the right and toward the armature. The rotation of the cam 65 thus serves to vary the effective spacing between the outer end of the arm 62 and the ratchet teeth of the wheel 60, whereby to provide control in the degree of turning movement of the wheel 60 in its response to each energizing cycle of the solenoid 71.

The solenoid 71 is connected in circuit with a microswitch 72 disposed in the housing 19 of the indexing head, as shown in Figs. 12 and 25, and a normally open table-controlled switch 72a, as shown in Figs. 5 and 25. The switch 72a is mounted on the bed plate 3 and arranged so that it will be operated to close an associated control circuit when the table 5 reaches an extreme left-hand position of movement.

Attached to the indexing disk 37 is a switch trip 73 which is disposed so that when the disk 37 assumes a definite position, following the completion of each revolution of the work-carrying spindle 31, the switch 72 will be actuated by the trip 73 to close the circuit in which the solenoid 71 is disposed.

Figure 13:
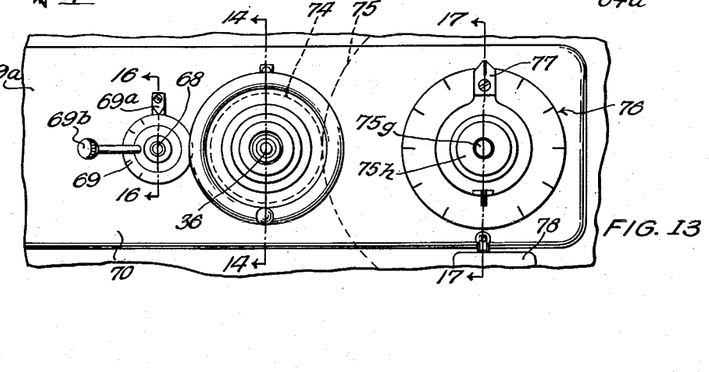
Fig. 13 is a front elevational view of the control panel of the machine.

Because of the ratchet wheel 60, which is turned by the energizing of the solenoid 71, mounted on the screw shaft 36, the actuation of said solenoid will advance the grinding wheel toward the plane of movement of the work body 32 to an extent controlled automatically by the setting of the dial 69. The ratchet wheel 60 has connected thereto a gear 74 which meshes with a larger gear 75, as shown in Fig. 13, the gear 75 forming a part of a dial assembly shown generally at 76 in Figs. 2 and 17.

In addition to the automatic control for governing the operating positions of the grinding wheel, mechanism is provided, as shown in Fig. 14, for adjusting the same manually. Thus, the feed shaft 36 is extended outwardly so that it is rotatably received in a bearing 74a provided on the control panel 59a of the base 1. The outer end of the shaft 36 is reduced and shouldered as at 74b and on which there is keyed a quill 74c, which latter carries a hand wheel 74d, also keyed thereto. A clamping nut 74e is threaded on the outer end of the quill 74c and is adapted to apply frictional clamping pressures to the wheel 74d to maintain the latter and the feed screw 36 in manually effected positions of adjustment. The back of the hand wheel 74d may be joined with a dial plate 74f which has its peripheral edge graduated for position-determining adjustment relative to a fixed pointer 74g carried by the front face of the panel 59a.

The dial assembly 76, as disclosed in Fig. 17, includes a stud shaft 75a to the inner end of which the large timing gear 75 is keyed, the hub 75b of the gear being confined on the shaft 75a through its engagement with a nut-held washer 75c and a boss extension 75d which forms a bearing 75e for the rotatable reception of the shaft 75a. The latter toward its outer end is formed with an enlarged head 75f and a reduced threaded extension 75g. A clamping nut 75h is threaded on the extension and is adapted to frictionally and adjustably confine a disk 75i between the rear face of the nut 75h and the head 75f, so that the disk 75i will revolve in unison with the shaft 75a. The disk is formed peripherally thereof with a trip 77 which engages with a base mounted micro-switch 78, the engagement of the trip with said last-named switch serving to open the main control circuit of the machine to arrest its automatic operation.

In the control circuit diagram of Fig. 25, there is disclosed a number of associated circuits whose operation is governed in part by manually operated starting and stopping switches mounted on the control panel 59a at the front of the machine. As shown in Fig. 25, the associated circuits are indicated at A, B, C and D.

The circuit A is joined with the supply leads L1 and L2 and includes the grinding wheel motor 36f and the main automatic cut-out switch 78 of the dial assembly 76. Also, arranged in the circuit A is a relay R, a manually operated, normally open, starting switch S1, a manually operated normally closed stopping switch S, and the field coil 80 of the relay R. When the starting switch S1 is actuated to initially close the circuit A, the coil 80 is excited to move the armature 81 of the relay so that the contact bar 82 of the armature will bridge the normally spaced contacts shown at 83. Current will thus be assumed to pass from the line L1 through the normally closed stopping switch S and thence through conductor 84 in which the normally closed cut out switch 78 is positioned. From the conductor current travels by way of terminal contacts 83, the relay contact bar 82 and a conductor 85 to the coil of the relay R, so that the coil will continue to be energized following the manual release of the initial starting switch S. This maintains the bar 82 in sustained engagement with the contacts 82 until the relay coil is deenergized by the opening of the switch 78, as previously described. The circuit A thus energizes the motor 36f to cause the rotation of the grinding wheel 33. The armature 81 carries a second contact bar 86 which, when the coil 80 is energized, is engaged with contact terminals 87, so that current will flow from line L1 through conductor 88 to the supply conductor 89 of circuit B. Further, the armature 81 carries a third contact bar shown at 90, which, when the relay coil 80 is excited, engages a pair of stationary contacts 91, whereby to unite the return conductors 92 of the circuits B, C and D with line L2 through said relay R.

The circuit B of Fig. 25 includes the electric motor M employed in operating the fluid-displacing mechanism used in transmitting motion to the table 5. Thus, the circuit B includes the conductor 89 which receives current from the line L1 when the relay R is closed or energized. Leading from the conductor 89 is a conductor 93 in which is disposed the normally closed stopping switch S2 and a normally open starting switch S3. When the switch S3 is closed, current passes by way of conductor 93 to the coil 94 of a second relay indicated generally at R1. The relay R1 includes an armature 95 which is movable in response to the field produced by the passage of current through the coil 94. From the coil 94 current flows through the motor M and thence to the return conductor 92. To maintain the coil 94 energized after the starting switch S3 is released, a conductor 96 is joined with conductor 93 between the switches S2 and S3, the conductor 96 extending to the terminal contacts 97 of the relay R1. The contacts 97 are adapted to be bridged and the circuit therethrough completed when the coil 94 is energized and the armature 95 attracted thereby to cause the contact bar 98 on the armature to engage the terminal contacts 97. This action causes current to flow from the second of the contacts 97 through conductor 99 to the coil 94, so that the latter will remain energized after the switch S3 is released. The circuit B includes a relay-shunting conductor 100 which leads from conductor 89 around the relay R1 to the motor M. Arranged in shunting conductor 100 is a pair of spaced terminal contacts which are adapted to be bridged by a contact bar 101 carried by the plunger of the switch S2. Thus, the switch S2 may be manually operated to start and stop the table-moving motor M in initially jogging the table into position-determining relation with the grinding wheel in adapting the machine for an automatic cycle of operation.

The circuit C includes and is employed to control the operation of the magnetic clutch or coupling 27, the circuit C including a conductor 102 which extends from the trunk conductor 89 to the contact terminals of a normally closed manually operated push-bottom type of stopping switch S4 and, also, the terminals of a normally open, manually operated, circuit-closing switch S5. From the switch S5 the conductor 102 is extended to the coil 103 of a third relay, the latter being indicated in its entirety by the reference character R2. From the coil 103 a conductor 104 leads to the return conductor 92. The closing of the circuit C by the operation of the switch S5 energizes the coil 103 of the relay R2, causing the armature 105 thereof to move and bring the cross bar 106 thereon into engagement with spaced contact terminals 107, so that, following release of the switch S5, the coil 103 will remain energized by the passing of current through conductor 108, the latter being joined at one end with conductor 102 at a point between the switches S4 and S5, the opposite end of the conductor extending to the relay coil 103.

A second contact bar 109 on the armature 105 of relay R2 upon the energizing of the latter moves into circuit-completing engagement with a pair of spaced terminal contacts 110. A conductor 111 extends from conductor 89 to one of the contacts 110 and arranged in the conductors are the limit switches 55 and 56 employed and controlled by the extent of movement of the table 5. From the second of the contacts shown at 110 a conductor 112 leads to the field coil 113 of the clutch or coupling 27 and from said field coil the conductor 113 extends to and is joined with the return conductor 92.

The fourth circuit, indicated generally at D in Fig. 25, includes a conductor 114 which is electrically joined with the conductor 89. Arranged in the conductor 114 is a normally closed manually operated stop switch S6 and a normally open starting switch S7. From the switch S7 the conductor 114 extends to the coil 115 of a fourth relay R3, and from the coil 115 the conductor 114 extends to the return conductor 92. To hold the coil 115 in an energized state after release of the switch S7 a conductor 116 leads from the conductor 114 at a point between switches S6 and S7 and extends to one of a pair of contact terminals 117. When the coil 115 is energized, an armature 118 of the relay R3 is operated to bring a contact bar 119 thereon into engagement with the terminals 117, so that current will flow from conductor 116, through terminals 117 and thence by way of conductor 120 to the coil 115 and return 92. A second contact bar 121 is carried by the relay armature 118. The bar 121 engages a pair of spaced contact terminals 122 and completes a circuit across them, when relay R3 is energized, so that current will be caused to flow through a conductor 123. The latter is joined at one end with the conductor 89 and includes therein the index head limit switches 72 and 72a. From the second of the terminals 122 the conductor 123 leads to the field coil of the solenoid 71 employed in the automatic infeed motion of the grinding wheel.

In view of the foregoing it will be evident that the present invention provides a machine for grinding work bodies to form spaced flutes, grooves or gashes therein, as in the formation and refinishing of milling machine cutters. The construction of the machine is such as to enable the operator to readily set up a particular operation. Thereafter, through the functioning of the automatic controls described, the various grinding steps will be successively performed on the work in a quick and accurate manner and without further attention or acts on the part of the machine attendant. When a given operation is completed the machine operation is terminated automatically and the condition is continued until the machine is again set up for another automatic cycle.

In initiating operation of the machine, a work body, as indicated at 32, is applied in any suitable manner to the outer end of the arbor 31 of the indexing head H, so that the work body within grinding limits will be securely supported on and by the arbor for rotation in unison therewith. The dressed grinding wheel 33 of required form is adjusted to a proper working plane. In certain operations the axis of the arbor 31 will extend parallel with the longitudinal axis of the table 5, as shown in Fig. 1. In other operations the axis of the arbor may be disposed in angular relation to that of the table. Such angularity is readily obtained by rotating the indexing head H bodily about its vertical axis on the table 5. In this connection, and as shown in Fig. 18, the base of the housing 19 of the head is formed with a circular flange 19a which is graduated as at 19b in the degrees of a circle, and clamping dogs 19c engage the flange 19a and are carried by the top of the table 5 to hold the housing firmly in its adjusted positions.

The housing 19 includes the removable cover plate 19' which is arranged at the left side thereof and provides, when removed, access to the vertical chamber 19d of the housing in which the indexing plate 37 is positioned. The plate 19' is held in place by means of removable screw-mounted nuts 19e having knurled outwardly disposed surfaces. When the plate 19' is removed from the head, it is a simple operation to replace a previously used indixing plate 37 on the spindle 30 by substituting a different indexing plate therefor, the change being effected through the removal of the spindle-carried clamping nut 37b. After the desired indexing plate has been mounted on the spindle 30 and secured in position by the tightening of the clamping nut 37b against the same, so that the selected plate 37 is seated on the tapered end 37a of the spindle, and the lock bar 46 inserted into the notch of the plate marked "O," as indicated in Fig. 11, the cover plate is restored to its position of head closure.

The index selector arm 77 on the control panel 59a may then be adjusted to provide for the desired number of consecutive indexing operations. By manipulating the switch S2 to bring the contact bar 101 into and out of engagement with the terminals of the circuit conductor 100, the table-operating motor may be operated to bring a work body on the arbor 31 into registry with the grinding wheel 33. Then, by operating the hand wheel 74d on the panel 59a the grinding wheel may be moved toward the work body to contact (spark) the same. After such contact has been established automatic table travel is instituted by closing all the switches S1, S3, S5 and S7, which enables the setting of the work body or cutter 32 to be checked and provides for automatic indexing operation on the part of the head H. The machine will then function automatically to perform the operations of indexing the work piece, feeding the same back and forth in front of and in groove-guiding contact with the grinding wheel, and stopping the operation when a predetermined number of cuts of appropriate depth are produced. The heart-shaped cam 10 controls the stroke of the table, the cam being constantly rotated in one direction by the motor M and its speed-reducing gearing M'. However, due to shape and proportions of the cam 10 the stroke imparted thereby to the piston 9, in the fluid-displacing chamber of the cylinder 6, is adequate to produce the required motion on the part of the piston 13 of the cylinder 7 in causing travel of the table 5.

When the table 5, under conditions of automatic operation, moves to approximately the end of its travel toward the left of the bed 1, as produced by the operation of the motor-driven cam 10, the indexing head H, which is mounted on the table adjacent its left end, is operated to effect incremental rotation of a work-holding arbor 31 associated therewith. Such operation is accomplished automatically by the engagement of the spring-pressed shoe 48a of the lever arm 48 with the beveled nose end 49c of the longitudinally adjustable slide member 49. The longitudinally variable operating positions of the member 49 are provided for the purpose of governing the period of time the escapement bar 46 is released from engagement with the teeth of the indexing disk or plate 37. This variation in the operating positions of the bar is effected by turning the selector handle 52, thereby rotating the shaft 51 and the gear 50, the latter being in mesh with the teeth of the slide member 49. Therefore, just before the table reaches the end of its movement to the left, the arm 48 contacts the bar member 49, the arm thereby turning from the position of Fig. 21 to that of Fig. 22. This turning movement of the arm results mechanically in imparting turning movement to the rod 38 and its frictionally joined sleeve 39, thus swinging the lever arm 43 in a direction withdrawing the escapement bar 46 from its retaining engagement with the teeth of the indexing disk, and enabling the latter to rotate with the gear-driven spindle 30 on which it is mounted.

To produce rotation of the gearing driving the spindle 30, it will be noted that when the lever 48 turns from the position of Fig. 21 to that of Fig. 22, the nose 48a of the lever engages the operating plunger 56a of the switch 56, closing circuit C and energizing the magnetic coupling or clutch 27. Since longitudinal movement of the table or carriage 5 causes the gear 26 to rotate through engagement of its teeth with the rack bar 28, which is stationary on the base plate 3, the rotary movement thus imparted to the gear 26 is transmitted through the clutch or coupling 27 to the gear 25 and thence through gear 29 to spindle 30, causing the work piece or body to index. In completing the circuit indicated at C in the energizing of the magnetic coupling 27, it will also be noted that the switch 55 which had previously been closed by the table-carried bracket 59, when the table 5 reached the end of its travel to the right, will remain closed until the table 5 has traveled to the extreme left at which time the switch 55 is opened by the contacting of the depending skirt 58 thus breaking the circuit for the magnetic coupling 27 and the switch 56. The switch 56 will be opened by the disengagement of the cam lever 48 when the table 5 commences its movement to the right. The opening of the circuit C by the switch 55 will thus prevent reverse rotation of the coupling 27 and its connected spindle 30 even though the switch 56 is held closed for a short interval of time. The switch mechanism 55 is readily adjustable to produce the required timing in operational sequence. It will be understood that the degrees of indexing movement thus intermittently imparted to the work spindle may be varied by the extent of linear travel of the table toward the left end of a given operating stroke following actuating contact of the arm 48 with the switch 56 and the resultant energizing of the magnetic coupling.

The opening of the circuit C, upon end of movement of the table 5 to the left, and the release of the lever arm 48 from the beveled end 49c of the slide member 49 when the table starts moving to the right, enables the escapement bar 46 to respond to the influence of the spring 47 and move into locking contact with the teeth of the disk 37 to hold the spindle stationary during the travel of the table in bringing a work body thereon into and out of engagement with the grinding wheel 33.

In controlling infeeding movement of the grinding wheel 33 toward the work body so as to progressively increase the depth of the grooves in said body, the switch 72 which, as shown in Figs. 11 and 12, is arranged in the chamber 19d of the housing 19 and is actuated by contact with the trip 73 mounted on the indexing disk 37 following each complete revolution of the spindle 30. At the time the circuit D is closed by the operation of the switch 72, the companion switch 72a is also closed to complete circuit D by contact of the operating member with a part of the table 5, for example, the skirt 58. The closing of circuit D excites the solenoid 71 so that the latch arm 62, by contact with the teeth of the ratchet 60, will cause the latter to rotate through a variable length arc regulated by the adjustment of the cam 65. This adjustment is produced by manually rotating the dial 69 which revolves gear 67 and cam 65, and thereby varying the position of the inclined surface 64a of the cam to control the effective stroke length of the arm 62 in its response to the attraction of the solenoid 71. The toothed outer end of the arm 62 engages the ratchet teeth of the wheel 60, which is keyed to the outer end of the screw shaft 36 and is employed in moving the carriage of the grinding wheel to control the relation between the peripheral edge of the grinding wheel and the reciprocating work body. Thus, depending on the setting of the dial 69, the grinding wheel will be caused to advance toward the plane of movement of the work body following each complete cycle of rotation of the indexing spindle. The screw shaft 36 may, if desired, be manually rotated by operating the wheel 74d when the work is being adjusted and prior to automatic operation.

The rotation of the wheel 60 imparts movement to the gear 74 joined therewith. Since the teeth of the gear 74 are in constant mesh with those of the relatively enlarged gear 75, rotary motion is imparted to the shaft 75a and thence to the dial 75i with each operation of the solenoid 71. These movements are such that at the end of a given automatic cycle, governed by the setting of the nut-held adjustment of the dial 75i, the trip 77 on said last-named dial will contact the operating member 78a of the switch 78 and thereby simultaneously open circuits A, B, C and D, through the deenergizing of the relay R, to arrest further automatic operation, and allowing a new work-grinding cycle to be inaugurated.

It will thus be seen that the present invention provides a completely automatic machine for forming, finishing, shaping and sharpening grooves, gashes, flutes, etc., in metallic work pieces, and hence eliminates entirely the possibility of human error which has heretofore been ever present in machines requiring manual operation in moving the work into engagement with a cutting element or vice versa. Further, the present machine is characterized by its versatility in adaptation to various forms of work and speed and positiveness of operation and adjustment. In addition to properly moving and indexing the work relative to the grinding wheel, the latter is moved automatically in adjustable, measured increments into the work to assume proper depth of cut with minimum load and wear upon machine parts.

While a single preferred form of machine has been illustrated and described herein in detail, it will be understood that various modifications as to design and details of construction may be resorted to without departing from the spirit of the invention or the scope of the following claims.

We claim:

1. A grinding machine of the character set forth, comprising: a base; a table; means carried by said base for imparting sustained reciprocatory movement to said table; a work-indexing head mounted on said table and movable therewith; a spindle rotatably carried in said head, said spindle being adapted to receive and hold a workpiece in elevated relation to said table; spindle-locking means carried in said head and normally restraining said spindle against rotation; drive means connected with said base and spindle for imparting indexing turning to the spindle, said drive means being operable during each cycle of reciprocating movement of said table to impart incremental rotation to said spindle, said drive means including an electrically energized clutch having an operating circuit and a switch in said circuit responsive to the movement of said table to a given position on said base for energizing said clutch; means also responsive to the movement of said table relative to said base for releasing said spindle-locking means to thereby permit incremental rotation of said spindle when said clutch is energized; and a motor-driven grinding wheel mounted on said base and having an edge portion arranged to be engaged by the outer circumferential portion of a workpiece mounted on said spindle during each cycle of reciprocating movement of said table.

2. A work-supporting and indexing head for metal-working machine tools, comprising: a casing; a spindle turnably supported in said casing and extending exteriorly thereof for the mounting of work pieces thereon; a spring-biased escapement mechanism normally restraining said spindle against turning movement when in a projected position and admitting of spindle turning when in a retracted position; shaft means rotatably positioned in said casing; means responsive to oscillatory movement of said shaft means to move said escapement mechanism between its spindle-releasing and restraining positions; a stationary machine bed; a table carrying said head and mounted for limited reciprocation on said bed; a stop device mounted on said bed; a crank extension carried by said shaft means for engagement with said stop device when said table reaches a position contiguous to one end of its reciprocatory travel stroke; spaced spindle indexing driving and driven gears independently turnable about said shaft means; a magnetic coupling operable when energized to transmit motion between said gears, said coupling including an operating circuit; a stationary bed-carried rack engaged with said driving gear for imparting spindle rotating movement thereto upon reciprocatory movement of said table; and a table-mounted switch controlling the operation of the circuit of said coupling, said switch including a movable operating member disposed in the path of movement of said crank extension and operable upon turning movement of said extension in its engagement with said stop device to close said circuit and energize said coupling.

3. Machine tool apparatus as specified in claim 2, and wherein said stop device is adjustable in the path of movement of said crank extension to control the duration of the period of contact of the extension with said stop device during table reciprocation.

4. In a metal-working machine tool; a stationary base member; a table mounted for reciprocatory movement on said member; an indexing head carried by said table, said head including a casing; a workpiece-receiving spindle supported for indexing turning movement in said casing; shaft means vertically journaled in said casing; a first gear rotatable about the axis of said shaft means and disposed below said casing; stationary rack means mounted on said base member below said casing for engagement with said gear to cause its rotation upon reciprocatory movement of said table; a second gear spaced from said first gear and rotatable about the axis of said shaft means; means driven by said second gear for imparting indexing turning movement to said spindle and a workpiece carried thereby; a magnetic coupling surrounding said shaft means and arranged within said casing and energizable to drivingly connect said first and second gears; a switch having a movable actuating member carried by and movable with said table and electrically connected with said coupling to control energization thereof; and a cam device mounted on said base member in the path of movement of said switch and arranged to be energized by the actuating member of said switch upon reciprocating movement of said table, said cam device when engaged by the actuating member of said switch serving to close the latter to thereby energize said coupling when said table approaches one end of its travel stroke, the energizing of said coupling serving to transmit rotating power from the first to said second gear in producing spindle rotation.

5. Machine tool apparatus as defined in claim 4, and wherein means are provided for adjusting the operating positions of said cam device on said base member to control the period of energization of said coupling in varying the angle produced by incremental indexing movement of said spindle in response to table reciprocation.

6. Machine tool apparatus as defined in claim 4, and wherein means are provided for maintaining said head in various positions of rotational adjustment on said table about the axis of said shaft means.

7. Machine tool apparatus as specified in claim 4, and wherein said spindle has one end thereof formed to interchangeably receive an indexing disk having a notched periphery; a movable spring-pressed latch member normally engaged with a notch of said disk to restrain said spindle against rotation; means actuated upon oscillation of said shaft means against spring resistance to remove said latch member from engagement with said disk to admit of rotation of said spindle when said gears are joined in power-transmitting relation by said coupling; and a crank extension provided on the lower part of said shaft means and biased by the spring-pressed latch member for engagement with said cam device to oscillate said shaft means in the actuation of said latch member.

8. In a grinding machine; a stationary base member; a horizontally disposed table mounted for confined and limited reciprocatory movement on said table; electric motor-driven means for reciprocating said table; an indexing head positioned on said table for movement in unison therewith, said head including a casing; a work-supporting and indexing spindle rotatably mounted within said casing, said spindle projecting horizontally exteriorly of said casing for the removable support of a workpiece on the outer end thereof; a grinding wheel having its outer circumferential edge disposed in the path of movement of a workpiece positioned on said spindle during reciprocatory travel of said table and head; an electric motor driving said grinding wheel; supporting means for said wheel and its motor mounted on said base member; rotatable threaded adjusting means carried by said base member for moving said wheel, its motor and said supporting means bodily toward and away from the longitudinal plane of movement of said spindle and workpiece in controlling penetration of the wheel into said workpiece; solenoid actuated pawl and ratchet means for imparting step by step rotation to said threaded adjusting means; a control circuit for said solenoid means including a first switch operative when said table reaches approximately the limit of its movement in one direction to energize said circuit and turn said threaded means; motion-transmitting means arranged in the casing of said head for indexing said spindle, said means including an escapement mechanism; a second switch for the control circuit of said solenoid means disposed in said head casing; and actuating means for second switch carried by said escapement mechanism.

9. In a grinding machine; a stationary base; a table arranged horizontally on said base for confined and limited reciprocatory travel; a work-supporting head mounted on said table for movement in unison therewith; said head including an upright casing; a spindle rotatably mounted in said casing, said spindle projecting longitudinally and horizontally beyond the casing for the reception of a workpiece to be ground; an electric motor-driven grinding wheel mounted on said base with its circumferential edge disposed for engagement with a workpiece supported on said spindle, whereby to groove said workpiece longitudinally; spindle-operating gear means carried by said head; stationary base-mounted gear means engaged with said head-carried gear means to produce rotation of the latter when said table is reciprocated; a magnetic coupling cooperative with said head-carried gear means to transmit the motion thereof to said spindle; an escapement mechanism controlling the release of said spindle to admit of its rotation by said gear means; mechanical means actuated by the movement of said table relative to said base for operating said escapement mechanism to admit of spindle rotation when said table reaches substantially an end position in its travel stroke; supporting means for said grinding wheel and its driving motor, said supporting means being bodily movable transversely of said base member; rotatable threaded means for imparting movement to said wheel-supporting means in controlling groove depth in a workpiece engaged by the wheel; solenoid means for operating said threaded means; a circuit for said solenoid means including an operating switch on said base, said switch being disposed for circuit-closing engagement with said table when the latter is moved into contact therewith at one end of its stroke; and a second switch for the circuit of said solenoid means operated in unison with the escapement mechanism of said head.

10. In a grinding machine; a stationary base; a horizontally disposed table mounted on said base for reciprocatory movement relative thereto; hydraulic means actuated by an electric motor for reciprocating said table; a work-supporting and indexing head mounted on said table, said head including a casing; a spindle rotatably mounted in said casing, said spindle projecting outwardly and longitudinally beyond said casing to support on the outer end thereof a workpiece; a substantially horizontally disposed grinding wheel; an adjustable base-mounted support for said wheel; an electric motor carried by said support for rotating said wheel; base-carried threaded means for moving said support laterally of the base to present the circumferential edge of the wheel to the side of a workpiece carried by said head spindle as the table reciprocates; solenoid means for intermittently and automatically actuating said threaded means with each operating stroke of the table to produce infeeding of the wheel in controlling groove depth in the workpiece; gearing carried by said indexing head and said base for imparting turning movement intermittently to said spindle when said table substantially reaches one end of its operating stroke; a magnetic coupling interposed in said gearing operative when energized to transmit the rotating power thereof to said spindle; an escapement mechanism normally holding said spindle against rotation; means releasing said escapement mechanism to admit of spindle rotation by said gearing when said table occupies said end position; interrelated electric circuits in which the operating motors of the hydraulic table-reciprocating and grinding wheel mechanism and the wheel-feeding solenoid and magnetic coupling are mounted, each of said circuits including a normally closed manually opened stopping switch; a normally open manually closed starting switch; a magnetically closed relay switch, the closing of the manual starting switch of each circuit energizing the relay switch thereof to maintain the circuit in a closed condition in producing operation of the operating appliance contained therein.

11. Grinding machine controlling apparatus as defined in claim 10, and wherein the operating circuits include a master switch; and means operable automatically upon a predetermined number of grinding wheel infeeding operations to produce actuation of the master switch and the opening of all circuits.

12. A work-supporting and indexing head for machine tools having a stationary bed and a reciprocatory head-carrying table, said head comprising a casing; a workpiece-supporting spindle turnably supported in said casing; an escapement mechanism mounted in said casing and serving normally to restrain said spindle against turning movement, and being movable to a position to release said spindle for turning movement; oscillatory shaft means journalled in said casing; means carried by said shaft means and responsive to oscillatory movement thereof for actuating said escapement mechanism; relatively spaced, rotatable driving and driven elements surrounding said shaft means; motion transmitting means actuated by the reciprocatory movement of said table and head relative to said bed to impart constant rotary movement to said driving element; means actuated by rotation of said driven element to impart turning movement to said spindle; electro-magnetic coupling means energizable to drivingly connect said driving and driven elements; a stop device carried by said bed; crank means provided on said shaft means and operative to impart oscillatory movement thereto upon engagement of said crank means with said stop device when said table approaches one end of its operating stroke, whereby to actuate said escapement mechanism to release said spindle for turning movement; and switch means carried by said table and electrically connected with said coupling means to control energization thereof, said switch means including a movable operating member engageable with said stop device to close an energizing circuit for said coupling means following release of said spindle by the actuation of said escapement mechanism.

13. An indexing head for machine tools as defined in and by claim 12, and wherein said stop device is adjustably supported by the machine bed to vary the period of switch closure and coupling energization in governing the angle of indexing turning movement of the spindle.

References Cited in the file of this patent
UNITED STATES PATENTS

| | | |
|---|---|---|
| 1,409,208 | Wieneke | Mar. 14, 1922 |
| 1,850,799 | Junge | Mar. 22, 1932 |
| 1,866,212 | Huxford et al. | July 5, 1932 |
| 2,021,066 | Huxford et al. | Nov. 12, 1935 |